Patented July 4, 1939

2,165,184

UNITED STATES PATENT OFFICE 2,165,184

PROCESS FOR PRODUCING ASCORBIC ACID

Richard Pasternack, Brooklyn, N. Y., and Peter P. Regna, North Bergen, N. J., assignors to Charles Pfizer & Company, Brooklyn, N. Y., a corporation of New Jersey No Drawing. Application August 31, 1938, Serial No. 227,666

6 Claims. (Cl. 260—344)

This invention relates to the production of ascorbic acid from esters of 2-keto-gulonic acid by means of a conversion induced by metallic magnesium.

It is disclosed in our copending application Serial No. 219,404, filed July 15, 1938, that this conversion takes place in aqueous solution by the action of certain metals such as iron, nickel, cobalt, manganese, cadmium and zinc. This surprising result is not general for the metallic elements, but we have now found that metallic magnesium is particularly effective, giving a high degree of conversion in a very short time. Moreover, magnesium is an efficient converting agent in the presence of substantial amounts of water-miscible organic solvents such as alcohol or dioxan.

The following examples indicate the method of procedure:

*Example 1.*—2-keto-1-gulonic methyl ester to 1-ascorbic acid.

41.6 g. of ester is dissolved in 75 cc. water and 25 cc. methanol. Between 90–95% of the theoretical amount of powdered magnesium (about 2.3 g.) is added and the mixture is boiled under reflux for 15–20 minutes when all the magnesium is dissolved. An analysis, by titrating an aliquot with iodine, shows an 84% conversion of the ester to ascorbic acid.

The calculated amount of oxalic acid (12 g.) is then added and the magnesium oxalate filtered out. The filtrate is evaporated to dryness, taken up with alcohol, filtered if necessary, and the ascorbic acid allowed to crystallize. The first crop (20 g.) yields 67% of the acorbic acid present and analyzes 98.8% by an iodine determination. The mother liquor is concentrated further and a second crop (5.3 g.) analyzes 98.5%.

The mother liquor is evaporated to dryness and esterified with alcoholic HCl. A subsequent conversion and crystallization yields 6 g. more of ascorbic acid, so that the total conversion is about 90%.

*Example 2.*—41.6 g. methyl ester in 150 cc. water was boiled 10 minutes with 2.4 g. of magnesium. An iodine titration showed that the conversion to ascorbic acid amounted to 82%. The solution was then treated with oxalic acid and worked up as in Example 1.

*Example 3.*—41.6 g. methyl ester was dissolved in 75 cc. of water and 75 cc. dioxan, and boiled 15 minutes with 2.3 g. of magnesium. The solution was then treated with oxalic acid and worked up as in Example 1. The yield as shown by iodine titration was 78%.

*Example 4.*—Conversion of 2-keto-1-gulonic butyl ester to 1-ascorbic acid.

39.8 g. of 2-keto-1-gulonic acid and 200 cc. of butyl alcohol containing ¼% HCl were heated on a steam bath for several hours until all the acid was dissolved. It was then evaporated to dryness, taken up with water and about 90% of the theoretical equivalent of powdered magnesium (2.2 g.) added. After 10 minutes boiling the solution was filtered. After removing the remaining butyl alcohol by distillation the residual aqueous solution showed 73% conversion to ascorbic acid. The ascorbic acid is recovered as in Example 1.

The invention claimed is:

1. Process for the conversion of esters of 2-keto gulonic acid to ascorbic acid which comprises subjecting an ester of 2-keto gulonic acid in a solution containing water to the action of metallic magnesium.

2. Process for converting the esters of 2-keto gulonic acid to ascorbic acid which comprises heating an ester of 2-keto gulonic acid in a solution containing water in the presence of 90 to 95% of one equivalent of metallic magnesium per mol of ester.

3. Process for producing 1-ascorbic acid which comprises subjecting an ester of 2-keto-1-gulonic acid in a solution containing water to the action of 90 to 95% of one equivalent of metallic magnesium per mol of ester.

4. Process for producing 1-ascorbic acid which comprises heating the methyl ester of 2-keto-1-gulonic acid in a solution containing water in the presence of 90 to 95% of one equivalent of metallic magnesium per mol of ester.

5. Process for the conversion of 2-keto-gulonic acid to ascorbic acid which comprises subjecting the esters dissolved in a solvent consisting of water and alcohol to the action of metallic magnesium.

6. Process for the conversion of 2-keto-gulonic acid to ascorbic acid which comprises subjecting the esters dissolved in a solvent consisting of water and dioxan to the action of metallic magnesium.

RICHARD PASTERNACK.
PETER P. REGNA.

Certificate of Correction

Patent No. 2,165,184. July 4, 1939.

RICHARD PASTERNACK ET AL.

It is hereby certified that errors appear in the printed specification of the above numbered patent requiring correction as follows: Page 1, first column, line 20; and second column, lines 4, 6, 30 and 35, for "2-keto-1-" read *2-keto-l-*; same page, first column, line 21, and second column, line 5 and lines 29 and 34, claims 3 and 4, respectively, for "1-ascorbic" read *l-ascorbic*; and that the said Letters Patent should be read with these corrections therein that the same may conform to the record of the case in the Patent Office.

Signed and sealed this 22d day of August, A. D. 1939.

[SEAL]

Leslie Frazer

*Acting Commissioner of Patents.*